UNITED STATES PATENT OFFICE 2,394,031

PROCESS FOR THE PRODUCTION OF CITRIC ACID

Selman A. Waksman, Highland Park, and Edward Otto Karow, New Brunswick, N. J., assignors to Merck & Co. Inc., Rahway, N. J., a corporation of New Jersey No Drawing. Application March 14, 1942,
Serial No. 434,786

13 Claims. (Cl. 195—36)

This invention relates to fermentation and to processes of fermentation for the production of citric acid.

The production of citric acid by fungi, particularly by certain species of Penicillium and by strains of *Aspergillus niger*, has been long known, but the obtainment of commercial quantities of citric acid by fermentation has hitherto required the practice of surface or shallow processes, which necessitated the growth of the fungi in a stationary position for the formation of a surface pellicle. Surface processes of fermentation are disadvantageous in that they require an extensive plant, and are therefore generally less efficient industrially than deep or submerged processes.

Prior to the present invention, a satisfactory economic industrial process for the production of citric acid, substantially free from other acids, by the submerged growth of fungi, has not been achieved. Wells and Ward, of the Bureau of Chemistry and Soils, United States Department of Agriculture, in "Industrial and Engineering Chemistry," vol. 31, February, 1939, page 175, considered the prevailing evidence of the impossibility of developing a submerged fermentation process for citric acid, stating:

"Considerable research effort has been expended on attempts to develop a submerged fermentation process for citric acid, and undoubtedly a large amount of unpublished work has been done on the problem. All reliable evidence indicates the impossibility of such technique. The reason for this failure is not definitely known, but it appears likely that some vital derangement in the enzyme system is responsible."

An object of this invention is to provide processes for the successful production of citric acid on an industrial scale by submerged fungal growth.

Another object of the invention is the utilization, in a submerged condition, of a species of Aspergillus, namely, *A. wentii*, which has not been hitherto employed in citric acid fermentation processes.

A further object is the utilization of this fungus in a form of growth peculiarly adapted to intense fermentative activity while in a submerged state.

Another object is to provide a comparatively simple and easily operable process for the fermentation of carbohydrates by means of this fungus, in a submerged condition, in the presence of suitable nutritional materials, and under such other environmental requirements of agitation, aeration, pressure and temperature, as are most conducive to a high yield of citric acid to the substantial exclusion of other acids.

Other objects will be apparent and a fuller understanding of this invention will be had by reference to the following description and claims.

In the present invention the applicants have developed a number of important procedures for the specific production of citric acid by the submerged process. Although each of these procedures may be modified from the exact specifications given herein, they are effective as a group and preferably as a sequence for the success of this process.

I. *Choice of organism.*—The applicants have found that, among the numerous organisms capable of producing citric acid and belonging to the Aspergillus and Penicillium groups, none is so effective as a strain of *Aspergillus wentii*.

The organism *Aspergillus wentii*, which one of these applicants isolated from the soil in 1915, was first described by Wehmer in 1896. Thom and Church more recently described it in "The Aspergilli" (Williams and Wilkins Co., Baltimore, Md., 1926).

An agar medium which is especially favorable to the development of *A. wentii* in the isolation and the identification of this organism and in the production of abundant spore material is one containing 5 grams of peptone, 10 grams of glucose, 1 gram of potassium dihydrophosphate, ½ gram of crystalline magnesium sulfate, and 15 to 25 grams of agar, per liter. The medium is sterilized at 10 pounds pressure for 30 minutes, and inoculated with a tube culture of *A. wentii*. The cultures are incubated, at 25° to 35° C., for about 7 to 20 days.

Cane sugar, or purified molasses containing an equivalent quantity of fermentable carbohydrates, may be used instead of glucose in an agar medium for the production of cell material and spores.

This organism, *A. wentii*, has three distinct advantages over the *Aspergillus niger* group, namely: (1) it grows rapidly under submerged conditions, as well as under surface conditions; (2) it produces citric acid abundantly; (3) it has only a slight tendency to produce oxalic and gluconic acids, and this tendency is substantially suppressed under the conditions of the processes herein described. A further advantage which *A. wentii* has is that it can withstand high acidity, whereas the members of Penicillium usually cannot. These facts, in relation to *A. wentii* and *A. niger*, are brought out in the following two illustrations:

(a) In the appended table is indicated the influence of the duration of the incubation upon citric acid production by A. wentii in comparison with the acid production by a vigorous strain of A. niger, measured in terms of the alkali required for the neutralization of the acid produced:

| Days of growth | Ml. of 0.25N NaOH needed to neutralize 5 ml. of the culture solution | |
|---|---|---|
| | A. wentii | A. niger |
| 3 | 1.2 | 0.7 |
| 5 | 2.9 | 1.0 |
| 9 | 4.3 | 1.3 |

(b) The following tabulation presents the relative data as to the acid-production capacity of A. wentii and various citric-acid-producing strains of A. niger, under comparable conditions:

| Organism | Total acid produced, ml. of 0.25N NaOH needed to neutralize 5 ml. of culture solution | Per cent conversion of sugar to acid |
|---|---|---|
| A. wentii | 9.5 | 25.8 |
| A. niger 5 | 2.0 | 5.5 |
| A. niger 6 | 1.3 | 3.2 |
| A. niger 7 | 1.7 | 4.8 |
| A. niger 9 | 0.6 | 1.4 |
| A. niger 29 | 5.4 | 13.0 |
| A. niger 32 | 1.7 | 4.8 |
| A. niger 35 | 2.1 | 6.2 |
| A. niger 37 | 0.1 | |
| A. niger 39 | 2.6 | 8.2 |
| A. niger 40 | 0.7 | 1.8 |

The numbers given to A. niger in this table are laboratory numbers of different cultures.

The differences found in the capacity to produce citric acid per se were actually greater than those shown in the foregoing illustrations of total acid production, because many of the A. niger strains produced oxalic acid as well as citric acid, whereas A. wentii produced practically only citric acid.

II. *Composition of medium.*—From the results of a large number of experiments it was found that a very favorable medium for the growth of A. wentii and the production of citric acid by this organism, under submerged conditions, is one having the following composition:

| | | |
|---|---|---|
| Cane sugar | grams | 150 |
| Urea | do | 1.0 |
| Magnesium sulfate (MgSO$_4$.7H$_2$O) | do | 0.5 |
| Potassium dihydrophosphate (KH$_2$PO$_4$) | do | 0.08 |
| Potassium chloride | do | 0.15 |
| Manganese sulfate (MnSO$_4$.7H$_2$O) | do | 0.02 |
| Zinc sulfate (ZnSO$_4$.7H$_2$O) | do | 0.01 |
| Water to make | cc | 1000 |

It has been found experimentally that urea can be used as a very satisfactory source of nitrogen. Glucose can be used in place of cane sugar.

III. *Acidification of medium.*—The pH of the medium is adjusted to 2.0 with hydrochloric acid, or other acid, just before the inoculation with the spores of A. wentii, in view of the fact that it has been found that a pH of about 2.0 to 3.0 is the optimum factor for the growth of the fungus in the most desirable vegetative type, for the production of citric acid by these submerged processes, and that this pH range is also a factor which is conducive to a substantially complete suppression of oxalic acid formation.

IV. *Oxygenation and agitation of medium.*—The results obtained by the applicants in studies of the effect of aeration of the medium described under "Composition of medium" by means of oxygen and of air, and of the effect of the absence of aeration, upon the production of citric acid by A. wentii, under submerged conditions and appropriate gentle agitation, at a temperature of 28° C., are illustrated by the following tabulation:

| Days of fermentation | Acid produced by treatment with (titratable acidity, Ml)— | | |
|---|---|---|---|
| | Oxygen | Air | No aeration |
| 5 | 3.0 | 1.2 | 0.9 |
| 7 | 4.1 | 1.4 | 1.1 |
| 12 | 7.4 | 2.0 | 1.4 |

Agitation of the culture medium is requisite throughout the course of the processes herein described, and, depending on the type of the chamber in which the fermentation is conducted, may be brought about in any suitable way, as by gentle stirring, rotating, rocking, or shaking, or by a combination of such procedures.

V. *Conditions of incubation.*—In the preparation of cultures of A. wentii, an optimum temperature for the incubation of the spores has been found to be 25° to 35° C., although temperatures of about 18° to 37° C. may be employed. The period of incubation varies from 7 to 15 days.

VI. *Form of fungus growth.*—In the attainment of the best results in every phase of the process, and in the development of the fungus growth which is most suitable in the practice of the process, it is important to obtain a granular, preferably a pearl-like or bead-like, type of growth. Flocculent and filamentous growth greatly reduces the effectiveness of the fungus. The best growth is bead-like in size and form, and is gray to yellowish or almost greenish in color. The formation and maintenance of this type of growth, which is most active in producing citric acid under submerged conditions, is governed primarily by the four factors outlined under I-IV. The optimum stage of development of the fungal growth can be determined by examination of the bead-like growth and the size of the beads, and by observation of their color.

VII. *Replacement of medium.*—When the optimum growth stage of the fungus has been substantially attained, the residue of the original medium is replaced. From the results of a large number of experiments, it has been found that a favorable medium for replacement is one having the following composition, which is adjusted to a pH of 2.0:

| | | |
|---|---|---|
| Cane sugar | grams | 150 |
| Urea | do | 0.5 |
| Potassium dihydrophosphate | do | 0.05 |
| Potassium chloride | do | 0.15 |
| Manganese sulfate (MnSO$_4$.4H$_2$O) | do | 0.02 |
| Zinc sulfate (ZnSO$_4$.7H$_2$O) | do | 0.01 |
| Water to make | cc | 1000 |

This replacement medium may also contain magnesium sulfate, and glucose can be used instead of cane sugar.

Such a replacement of the medium effects considerable savings in the time and the sugar required to produce the fungal growth. The production of citric acid sets in immediately, and much higher yields are obtained, as the following example of the production of citric acid by *A. wentii*, submerged during the growth stage and the replacement stage, illustrates:

| Days of fermentation | Growth stage (medium as described under "Composition of medium") | | Replacement stage (medium as described under: "Replacement of medium") | |
|---|---|---|---|---|
| | Acid produced, ml. of 0.25N NaOH needed to neutralize 5 ml. of culture solution | Sugar converted, per cent | Acid produced, ml. of 0.25N NaOH needed to neutralize 5 ml. of culture solution | Sugar converted, per cent |
| 4 | 0.3 | | 5.2 | 32.9 |
| 6 | 5.4 | 51.5 | 9.3 | 41.2 |
| 8 | 9.9 | 53.2 | 12.2 | 47.1 |
| 10 | 11.6 | 52.9 | 15.2 | 52.2 |

VIII. *Partial neutralization of acid.*—It has been found that either calcium carbonate or calcium hydroxide is decidedly helpful as a neutralizing agent in the practice of this process, since oxalic acid is produced when caustic soda or caustic potash is used as a neutralizing agent. Partial neutralization up to about one-third of the titratable acidity of the medium can be carried out with such calcium compound as a means of increasing the production of the citric acid. The pH should not exceed 3.0.

IX. *Effect of combining the steps related.*—It has been further found that a high yield of citric acid can be obtained by combining the several treatments already indicated. This is brought out in the following figures of the yields of citric acid obtained by the action of a submerged growth of *A. wentii* in a partially neutralized sugar medium:

| Days of fermentation | Citric acid produced | Sugar consumed (total sugar in medium, 15 gm.) | Conversion of sugar to acid |
|---|---|---|---|
| | Grams | Grams | Percent |
| 3 | 3.46 | 8.06 | 42.9 |
| 5 | 5.01 | 11.44 | 43.9 |
| 7 | 7.13 | 13.58 | 52.5 |

X. *Production of pure citric acid.*—In the industrial practice of a submerged process for producing citric acid, it is highly essential that only this acid is formed. In this connection, it has been found that the degree or the extent of the neutralization of the citric acid formed during the fermentation, and the kind of neutralizing agent used, control the result in that they prevent the formation of other acids. When caustic soda or caustic potash is used for the neutralization of the acid, there is a pronounced inducement of oxalic acid formation.

XI. *Use of molasses in place of sugar.*—Molasses can be used in place of sugar for the production of citric acid by the submerged process of fermentation herein described. The use of a purified, or "high-test," molasses is preferred, however, as a means of producing large and economical yields of citric acid, inasmuch as certain types of grades of molasses have been found to contain various substances which may tend to impair the fullest activity of the process. The "purification" of the molasses is mainly directed to the removal of most of the ash or mineral as well as some of the nitrogen compounds found in varying amounts in some molasses.

The following composition, adjusted to pH 2.0, provides a satisfactory medium utilizing a purified molasses:

Purified molasses, equivalent to total sugars
of _____ grams__ 150
Urea _____ do____ 1.0
Magnesium sulfate ($MgSO_4.7H_2O$) __do____ 0.5
Potassium dihydrophosphate _____ do____ 0.08
Potassium chloride _____ do____ 0.15
Manganese sulfate ($MnSO_4.4H_2O$) __do____ 0.02
Zinc sulfate ($ZnSO_4.7H_2O$) _____ do____ 0.01
Water to make _____ cc__ 1000

XII. *Purification of molasses.*—In view of the fact that certain grades of molasses afford comparatively low yields of citric acid in the submerged process, it has been found that such molasses can be advantageously purified by various agents, such as by bauxite, bone char, "Suchar CSP" (activated carbon), and by certain resins which are made available under the name of "Amberlites." Molasses, purified by any one or by two or more of these purifying agents, affords an increased yield of citric acid, during both the growth phase and the replacement phase of the fermentation process.

The "Amberlites" are synthetic ion-exchange resins. "Amberlite" 1R1 is a cation-exchange resin of the phenol-formaldehyde type, containing free phenolic hydroxyl groups. "Amberlite" 1R4 is an anion-exchange resin of the amine-formaldehyde type, containing amino groups capable of forming amine salts.

The following tables illustrate the effect of the purification of molasses upon the yield of citric acid, as compared with the yield of citric acid from cane sugar, in processes of submerged fermentation by *A. wentii*:

Table I

| | Acid produced after 8 days' incubation. Ml. of 0.25N NaOH needed to neutralize 5 ml. of culture solution | Sugar converted to citric acid |
|---|---|---|
| | | Per cent |
| Untreated molasses | 3.3 | 7.2 |
| Molasses filtered twice through bone char | 7.5 | 20.5 |
| Molasses filtered through resins | 8.8 | 28.0 |
| Cane sugar | 13.2 | 37.6 |

Table II

| | Titratable acidity, cc. 0.25N NaOH | Sugar consumed | Sugar converted to citric acid |
|---|---|---|---|
| | | Grams | Per cent |
| Untreated molasses | 9.0 | 15.00 | 19.4 |
| Molasses previously treated with bone char, "Suchar," and resins | 21.7 | 11.33 | 61.9 |
| Cane sugar | 23.35 | 11.25 | 67.1 |

Fermentation 12 days.

The process of producing citric acid by *A. wentii* under submerged conditions can be conducted by the following steps preferably in their sequence and combination:

*Example I*

*Aspergillus wentii* is first grown on a suitable agar medium, such as that which has been indicated herein, for a period of 7 to 20 days, for the production of an abundance of spore material. One of the described media for the production of citric acid is now sterilized, adjusted to pH 2.0, and inoculated with a heavy suspension of spores in sterile water. The inoculated medium is then placed in a suitable chamber, or the medium may be sterilized in the chamber and then inoculated. Any chamber having an inner surface of enamel, or stainless steel, or other metal resistant to the medium and to citric acid, may be used. Next, the growth phase is initiated. The contents of the chamber are now continuously agitated, while either air under pressure, or oxygen at atmospheric pressure, or a mixture of oxygen and air under pressure, is simultaneously admitted into the chamber. The contents of the chamber are maintained at a temperature of about 25° to 35° C. As soon as a substantial quantity of citric acid has been formed, a sterile suspension of calcium carbonate or calcium hydroxide is added to neutralize such a quantity of the formed acid that the pH does not exceed 3.0. Agitation and aeration are continued for a period of 7 to 15 days. When the fungal growth has attained an optimum stage of development, as previously indicated, and when most of the sugar has been converted to citric acid, the acid solution is withdrawn from the chamber, and the replacement phase is begun. The withdrawn solution is replaced with a supply of the replacement medium. The fermentation is resumed for another 5 to 10 days, under similar conditions. Further such replacements are made as long as the growth of the fungus continues to be adequately operative.

*Example II*

Cuban invert molasses is diluted with distilled water to afford a solution containing about 15 per cent of total carbohydrates. The solution is treated with bone char, "Suchar CSP," and "Amberlites" 1R1 and 1R4. The pale yellow liquor is decanted or filtered from the resulting mixture. To this liquor are now added urea and inorganic salts in the concentrations indicated in the foregoing formula under the "Use of molasses in place of sugar." The medium thus prepared is sterilized by heat, adjusted to a pH of 2.0, and inoculated with the cell material of *Aspergillus wentii* previously developed on a cane sugar or other carbohydrate medium. Submerged fermentation in a deep culture tank is then conducted, under continuous agitation and aeration under pressure or oxygenation at atmospheric pressure, at a temperature of about 25° to 35° C. and at a pH value not exceeding 3.00, as described in the foregoing example. Practically all the carbohydrate is converted into citric acid in about 12 days.

The references herein to "sugar," "cane sugar," "glucose," and "carbohydrate" are intended to imply the operativeness in these processes of all monosaccharides and disaccharides, or mixtures thereof. Mixtures of monosaccharides, disaccharides and starch or starches can also be used. Starch or starches, without sugar, can be utilized, due regard being had to the viscosity of a starchy dispersion. In this regard, the practical limit of starch concentration has been found to be at about 5 per cent, preferably about 3 per cent. Inulin may also be employed in these processes.

The examples herein are given by way of illustration and not of limitation, as it is obvious that certain modifications may be made in the compositions of the media and in the steps of the fermentation process, and in the kinds and proportions of the materials employed, without departing from the spirit and the scope of the invention and the purview of the claims.

We claim:

1. Process of producing citric acid comprising forming a medium of carbohydrate selected from the group consisting of monosaccharides, disaccharides, starches, inulin and materials containing these carbohydrates, and nutrient inorganic and nitrogen-containing substances, supplying thereto citric-acid-producing strains of *Aspergillus wentii*, and maintaining agitation and aeration such as to disperse oxygen through the medium and to induce and maintain the growth of the said strains in a submerged condition throughout the medium.

2. Process for the production of citric acid from fermentable carbohydrates selected from the group consisting of monosaccharides, disaccharides, starches, inulin, and materials containing these carbohydrates, by means of citric-acid-producing strains of *Aspergillus wentii*, which comprises the successive steps of sterilizing a medium containing nutrient materials and such carbohydrates, adjusting the pH value of the said medium to 2.0, inoculating the said medium with the said strains of *Aspergillus wentii*, continuously agitating and simultaneously aerating the resulting inoculated medium under pressure, meanwhile developing fungal growth in a submerged condition in the said inoculated medium at a temperature range of approximately 18° to 37° C., adding to the resulting nutrient culture solution a member of the group consisting of calcium carbonate and calcium hydroxide to raise the pH value to not more than 3.0 after a substantial quantity of citric acid has been produced therein, meanwhile subjecting the said nutrient culture solution to similar conditions of agitation, aeration, pressure and temperature, removing substantially the liquid part of the residue of the said nutrient culture solution, adding a fresh supply of medium of carbohydrate and nutrient materials to the residual masses of fungal mycelium, subjecting the renewed medium and the fungal mycelium submerged therein to similar conditions of agitation, aeration, pressure and temperature, meanwhile maintaining the pH value of the medium at not more than 3.0, and conducting the fermentation to substantial completion.

3. Process for the production of citric acid from fermentable carbohydrates selected from the group consisting of monosaccharides, disaccharides, starches, inulin, and materials containing these carbohydrates, by means of citric-acid-producing strains of *Aspergillus wentii*, which comprises the successive steps of sterilizing a medium containing nutrient materials and such carbohydrates, adjusting the pH value of the said medium to 2.0, inoculating the said medium with the said strains of *Aspergillus wentii*, continuously agitating and simultaneously supplying oxygen at atmospheric pressure to the resulting inoculated medium, meanwhile developing fungal growth in a submerged condition in the said inoculated medium at a temperature range of approximately 18° to 37° C., adding to the resulting nutrient culture solution a member of the group consisting of calcium carbonate and calcium hydroxide to raise the pH value to not more than 3.0 after a substantial quantity of citric acid has been produced therein, meanwhile subjecting the said nutrient culture solution to similar conditions of agitation, temperature, and oxygenation at atmospheric pressure, removing substantially the liquid part of the residue of the said nutrient culture solution, adding a fresh supply of medium of carbohydrate and nutrient materials to the residual masses of fungal mycelium, subjecting the renewed medium and the fungal mycelium submerged therein to similar conditions of agitation, temperature, and oxygenation at atmospheric pressure, meanwhile maintaining the pH value of the medium at not more than 3.0, and conducting the fermentation to substantial completion.

4. Process for the production of citric acid by fungal fermentation, comprising the successive steps of preparing an aqueous solution of purified molasses to afford a total carbohydrate concentration of about 5 to 20 per cent, preferably 15 per cent, supplementing such solution with nutrient materials, sterilizing the resulting nutrient medium by heat, adjusting the pH value of this nutrient medium to 2.0, inoculating the sterile nutrient medium with a pure culture of citric-acid-producing strains of *Aspergillus wentii*, incubating the resulting inoculated nutrient medium from about 4 to 12 days, at about 25° to 35° C., until the maximum mycelial growth has been attained, meanwhile supplying air under gentle agitation under pressure, adding a sterile suspension of a member of the group consisting of calcium carbonate and calcium hydroxide to neutralize a part of the formed acid and to raise the pH of the nutrient medium to not more than 3.0, removing the residual medium from the fermenting chamber when the fungal growth of mycelium becomes characterized by small bead-like forms, adding to the residual fungal growth a replacement supply of liquid medium containing nutrient materials and purified molasses to afford a total carbohydrate concentration of about 5 to 20 per cent, preferably 15 per cent, allowing the fungal growth to act upon the said renewed medium for a period varying from 4 to 12 days, under similar conditions of agitation, aeration, pressure and temperature, removing the residual medium and replacing it by successive fresh supplies of media containing nutrient materials and purified molasses in similar concentration until the citric-acid-producing capacity of the fungal growth is substantially exhausted, meanwhile maintaining the pH value of the added media at not more than 3.0.

5. In a process for the production of citric acid from carbohydrates selected from the group consisting of monosaccharides, disaccharides, starches, inulin, and materials containing these carbohydrates, by means of citric-acid-producing strains of *Aspergillus wentii*, involving the operations of preparing a carbohydrate solution containing any of the said carbohydrates and nutrient inorganic and nitrogen-containing materials, and inoculating the said solution with the said strains, the steps of inducing the growth and maintenance of the fungal mass of the said strains in small bead-like forms, and of inhibiting flocculent and filamentous formations of the said strains, by continual agitation and aeration of the inoculated carbohydrate nutrient solution during the growth stage and throughout the entire fermentation periods, at a temperature range of about 18° to 37° C.

6. In a process for the production of citric acid, the steps of growing bead-like forms of citric-acid-producing strains of *Aspergillus wentii* in a submerged condition, which comprise preparing a culture solution of carbohydrates selected from the group consisting of monosaccharides, disaccharides, starches, inulin, and materials containing these carbohydrates, in concentrations up to about 3 to 20 per cent of total carbohydrates, the said solution also containing urea, magnesium sulfate, potassium dihydrophosphate, potassium chloride, manganese sulfate and zinc sulfate, sterilizing the said culture solution by heat, adjusting the reaction to a pH value of 2.0, inoculating the sterilized culture solution with a pure culture of citric-acid-producing strains of *Aspergillus wentii*, incubating the resulting inoculated culture solution for about 4 to 12 days, at about 25° to 35° C. until the maximum mycelial growth in the form of beads has been attained, and meanwhile agitating the inoculated culture solution and supplying air thereto under pressure.

7. In a process for the production of citric acid from carbohydrates selected from the group consisting of monosaccharides, disaccharides, starches, inulin, and materials containing these carbohydrates, by means of citric-acid-producing strains of *Aspergillus wentii*, involving the operations of preparing a carbohydrate solution containing nutrient materials and inoculating such nutrient solution with such strains, the step of adjusting the pH value of the said solution to 2.0 just before the inoculation of the said solution with the spores of *Aspergillus wentii*, whereby the optimum growth of such strains in vegetative bead-like forms is obtained and the formation of oxalic acid is substantially suppressed.

8. In a process for the production of citric acid from carbohydrates selected from the group consisting of monosaccharides, disaccharides, starches, inulin, and materials containing these carbohydrates, by means of citric-acid-producing strains of *Aspergillus wentii*, involving the operations of preparing a carbohydrate solution containing nutrient materials and inoculating said solution with such strains, the step which consists in adding to the culture medium a neutralizing agent of the group consisting of calcium carbonate and calcium hydroxide to raise the pH value of the said medium to not more than 3.0, after the formation of citric acid has definitely progressed in the said medium, whereby the production of citric acid is increased and the formation of oxalic acid is substantially suppressed.

9. In a process for the production of citric acid from molasses, involving the operations of preparing a medium containing purified molasses and nutrient materials and inoculating the said medium with citric-acid-producing strains of *Aspergillus wentii*, the steps which consist in first treating unpurified molasses with bone char, Suchar, and resins, then filtering the resulting product, dissolving the said nutrient materials in the filtrate, and adjusting the pH value of the resulting solution by acidification to 2.0.

10. Process of producing citric acid comprising forming a medium of cane sugar and inorganic and nitrogen-containing substances, supplying thereto citric-acid-producing strains of *Aspergillus wentii*, and maintaining agitation and aeration such as to disperse oxygen through the medium and to induce and maintain the growth of the said strains in a submerged condition throughout the medium.

11. Process of producing citric acid comprising forming a medium of glucose and inorganic and nitrogen-containing substances, supplying thereto citric-acid-producing strains of *Aspergillus wentii*, and maintaining agitation and aeration such as to disperse oxygen through the medium and to induce and maintain the growth of the said strains in a submerged condition throughout the medium.

12. Process of producing citric acid comprising forming a medium of molasses and inorganic and nitrogen-containing substances, supplying thereto citric-acid-producing strains of *Aspergillus wentii*, and maintaining agitation and aeration such as to disperse oxygen through the medium and to induce and maintain the growth of the said strains in a submerged condition throughout the medium.

13. Process for the production of citric acid which comprises inoculating with a citric-acid-producing strain of *Aspergillus wentii* an aqueous medium comprising urea, magnesium sulfate, potassium dihydrophosphate, potassium chloride, manganese sulfate, zinc sulfate, and carbohydrate selected from the group consisting of monosaccharides, disaccharides, starches, inulin and materials containing these carbohydrates, and then agitating and aerating the inoculated medium so as to permit submerged, aerobic mold growth and fermentation.

SELMAN A. WAKSMAN.
EDWARD OTTO KAROW.

---

Certificate of Correction

Patent No. 2,394,031.   February 5, 1946.

SELMAN A. WAKSMAN ET AL.

It is hereby certified that error appears in the printed specification of the above numbered patent requiring correction as follows: Page 2, first column, line 58, for "($MnSO_4.7H_2O$)" read ($MnSO_4.4H_2O$); and that the said Letters Patent should be read with this correction therein that the same may conform to the record of the case in the Patent Office.

Signed and sealed this 28th day of May, A. D. 1946.

[SEAL]

LESLIE FRAZER,
*First Assistant Commissioner of Patents.* and nitrogen-containing substances, supplying thereto citric-acid-producing strains of *Aspergillus wentii*, and maintaining agitation and aeration such as to disperse oxygen through the medium and to induce and maintain the growth of the said strains in a submerged condition throughout the medium.

12. Process of producing citric acid comprising forming a medium of molasses and inorganic and nitrogen-containing substances, supplying thereto citric-acid-producing strains of *Aspergillus wentii*, and maintaining agitation and aeration such as to disperse oxygen through the medium and to induce and maintain the growth of the said strains in a submerged condition throughout the medium.

13. Process for the production of citric acid which comprises inoculating with a citric-acid-producing strain of *Aspergillus wentii* an aqueous medium comprising urea, magnesium sulfate, potassium dihydrophosphate, potassium chloride, manganese sulfate, zinc sulfate, and carbohydrate selected from the group consisting of monosaccharides, disaccharides, starches, inulin and materials containing these carbohydrates, and then agitating and aerating the inoculated medium so as to permit submerged, aerobic mold growth and fermentation.

SELMAN A. WAKSMAN.
EDWARD OTTO KAROW.

---

Certificate of Correction

Patent No. 2,394,031. February 5, 1946.

SELMAN A. WAKSMAN ET AL.

It is hereby certified that error appears in the printed specification of the above numbered patent requiring correction as follows: Page 2, first column, line 58, for "(MnSO$_4$.7H$_2$O)" read *(MnSO$_4$.4H$_2$O)*; and that the said Letters Patent should be read with this correction therein that the same may conform to the record of the case in the Patent Office.

Signed and sealed this 28th day of May, A. D. 1946.

[SEAL]

LESLIE FRAZER,
*First Assistant Commissioner of Patents.*